US012631713B2

(12) United States Patent
Ko et al.

(10) Patent No.: US 12,631,713 B2
(45) Date of Patent: May 19, 2026

(54) LOCATION ESTIMATION DEVICE AND METHOD FOR ESTIMATING LOCATION OF TRANSMITTING DEVICE UNDER WATER

(71) Applicant: Hoseo University Academic Cooperation Foundation, Chungcheongnam-do (KR)

(72) Inventors: Hak-Lim Ko, Chungcheongnam-do (KR); Ho-Jun Lee, Chungcheongnam-do (KR)

(73) Assignee: Hoseo University Academic Cooperation Foundation, Chungcheon gnam-do (KR)

( * ) Notice: Subject to any disclaimer, the term of this patent is extended or adjusted under 35 U.S.C. 154(b) by 329 days.

(21) Appl. No.: 18/370,727

(22) Filed: Sep. 20, 2023

(65) Prior Publication Data

US 2025/0076447 A1 Mar. 6, 2025

(30) Foreign Application Priority Data

Aug. 29, 2023 (KR) ........................ 10-2023-0113337

(51) Int. Cl.
 G01S 5/02 (2010.01)
 G01S 5/06 (2006.01)
(52) U.S. Cl.
 CPC .............. G01S 5/0273 (2013.01); G01S 5/06 (2013.01); *G01S 2205/04* (2020.05)
(58) Field of Classification Search
 None
 See application file for complete search history.

(56) References Cited

U.S. PATENT DOCUMENTS

2025/0289545 A1* 9/2025 L'Her .................... B63G 8/001

FOREIGN PATENT DOCUMENTS

KR 20130000089 A 1/2013

OTHER PUBLICATIONS

Samsung Electronics Co., Ltd., Method and Apparatus for Estimating 3D Position and Orientation by Means of Sensor Fusion, Abstract, https://worldwide.espacenet.com/patent/search/family/047362632/publication/KR20130000089A?q=101815938, 1 page.

* cited by examiner

*Primary Examiner* — Whitney Moore
(74) *Attorney, Agent, or Firm* — Baker Donelson

(57) ABSTRACT

A transmitting device location estimation device and a transmitting device location estimation method for estimating the location of a transmitting device under water are disclosed. A transmitting device location estimation device, in a transmitting device location estimation device for estimating the location of a transmitting device under water, is characterized by comprising: a distance location estimation unit that estimates the distance and location of the transmitting device based on the time taken to receive the transmission signal transmitted by the transmitting device and the speed of the transmission signal; a direction estimation unit that estimates the direction of the transmitting device; and an estimated location confirmation unit that confirms the estimated location of the transmitting device based on the estimated distance and location of the transmitting device and the estimated direction of the transmitting device.

8 Claims, 6 Drawing Sheets

LOCATION ESTIMATION DEVICE AND METHOD FOR ESTIMATING LOCATION OF TRANSMITTING DEVICE UNDER WATER

CROSS REFERENCE TO RELATED APPLICATIONS

This nonprovisional application claims the benefit of priority under 35 USC § 119 to Korean Patent Application No. 10-2023-0113337, filed on Aug. 29, 2023, the entirety of which is incorporated herein by reference.

BACKGROUND OF THE INVENTION

Field of the Invention

The present invention relates to a transmitting device location estimation device and a method for estimating the location of the transmitting device, and more specifically relates to a transmitting device location estimation device and a method for estimating the location of the transmitting device under water, capable of estimating the location of a transmitting device accurately without error even if signals reflected by the seafloor and sea surface are received not only in deep water but also in shallow water.

Description of the Background

As digital electronic devices and communication technologies develop, it is now possible to monitor fish distribution, water accident recovery, water lifesaving, and water situation judgment by installing water communication devices on fishes, divers, nets, water equipment, and the like by using information communication between water communication devices.

Each of these water communication devices is given a unique ID (identity), the transmitting device includes its own ID in the signal being transmitted and transmits it, and the receiving device identifies each transmitting device based on the ID of the signal being transmitted from pluralities of transmitting devices and estimates its location.

However, in a water channel environment in shallow water, the signal transmitted by the transmitting device is received after being reflected by the sea surface and sea floor, and there is a problem in that the location of the transmitting device being estimated based on the reflected and received signal is significantly different from the location information of the actual transmitting device.

SUMMARY OF THE INVENTION

The present invention created for solving the above-mentioned problems is intended to provide a transmitting device location estimation device and a method for estimating the location of the transmitting device under water, capable of estimating the location of a transmitting device accurately without error even if signals reflected by the seafloor and sea surface are received not only in deep water but also in shallow water.

A transmitting device location estimation device according to one aspect of the present invention for achieving the above-described purpose, in a transmitting device location estimation device for estimating the location of a transmitting device under water, the transmitting device location estimation device is characterized by comprising: a distance location estimation unit that estimates the distance and location of the transmitting device based on the time taken to receive the transmission signal transmitted by the transmitting device and the speed of the transmission signal; a direction estimation unit that estimates the direction of the transmitting device; and an estimated location confirmation unit that confirms the estimated location of the transmitting device based on the estimated distance and location of the transmitting device and the estimated direction of the transmitting device.

Here, the estimated location confirmation unit may include: a vertical distance calculation unit that calculates a vertical distance to the transmitting device based on the estimated distance and location of the transmitting device and the estimated direction of the transmitting device; and a distance location estimation unit that corrects the estimated location of the transmitting device when the calculated distance in the vertical direction is greater than or equal to a preset distance.

In addition, the estimated location confirmation unit may further include: a reflection angle estimation unit that estimates a reflection angle of the transmission signal from the sea floor or sea water surface when the calculated distance in the vertical direction is greater than or equal to a preset distance; and a reflection distance calculation unit that calculates the reflection distance to a reflection point of the transmission signal. In this case, the estimated location correction unit corrects the estimated location of the transmitting device based on the estimated distance of the transmitting device, the estimated reflection angle, and the calculated reflection distance to the reflection point.

The above-described transmitting device location estimation device further includes a signal reception module for receiving the transmission signal using pluralities of reception sensors, wherein the distance location estimation unit and the direction estimation unit may share at least one reception sensor among the pluralities of reception sensors, thereby estimating the distance and location and direction of the transmitting device.

In addition, the above-described transmitting device location estimation device further includes a signal reception module that receives the transmitted signal using pluralities of reception sensors, wherein the distance location estimation unit and the direction estimation unit can also estimate the distance, location, and direction of the transmitting device by using different reception sensors among the pluralities of the reception sensors.

A method for estimating the location of a transmitting device according to one aspect of the present invention to achieve the above-described purpose, in a method for estimating the location of a transmitting device under water, is characterized by comprising the steps of: estimating the distance and location of the transmitting device based on the time it takes to receive a transmission signal transmitted by the transmitting device and the speed of the transmission signal; estimating the direction of the transmitting device; and confirming the estimated location of the transmitting device based on the estimated distance and location of the transmitting device and the estimated direction of the transmitting device.

Here, the step of confirming the estimated location of the transmitting device may include the steps of: calculating a vertical distance to the transmitting device based on the estimated distance and location of the transmitting device and the estimated direction of the transmitting device; and correcting the estimated location of the transmitting device when the calculated vertical distance is more than a preset distance.

In addition, the step of conforming the estimated location of the transmitting device may further include the steps of estimating a reflection angle of the transmission signal on the sea floor or sea surface when the calculated vertical distance is greater than or equal to a preset distance; and calculating the reflection distance to the reflection point of the transmission signal. In this case, the step of correcting the estimated location corrects the estimated location of the transmitting device based on the estimated distance of the transmitting device, the estimated reflection angle, and the calculated reflection distance to the reflection point.

The above-described transmitting device location estimation method further includes a step of receiving the transmitted signal using pluralities of reception sensors included in a signal reception module, wherein the step of estimating the distance and location of the transmitting device and the step of estimating the direction of the transmitting device may share at least one reception sensor among the pluralities of reception sensors, thereby estimating the distance, location, and direction of the transmitting device.

In addition, the above-described method for estimating the location of the transmitting device further includes a step of receiving the transmitted signal using pluralities of reception sensors included in a signal reception module, wherein the step of estimating the distance and location of the transmitting device and the step of estimating the direction of the transmitting device may also estimate the distance, location, and direction of the transmitting device by using different reception sensors among the pluralities of reception sensors.

According to the present invention, it becomes possible to accurately estimate the location of the transmitting device without error even if signals reflected by the seafloor and sea surface are received not only in deep water but also in shallow water.

DETAILED DESCRIPTION OF THE PREFERRED EMBODIMENTS

Figure 1:
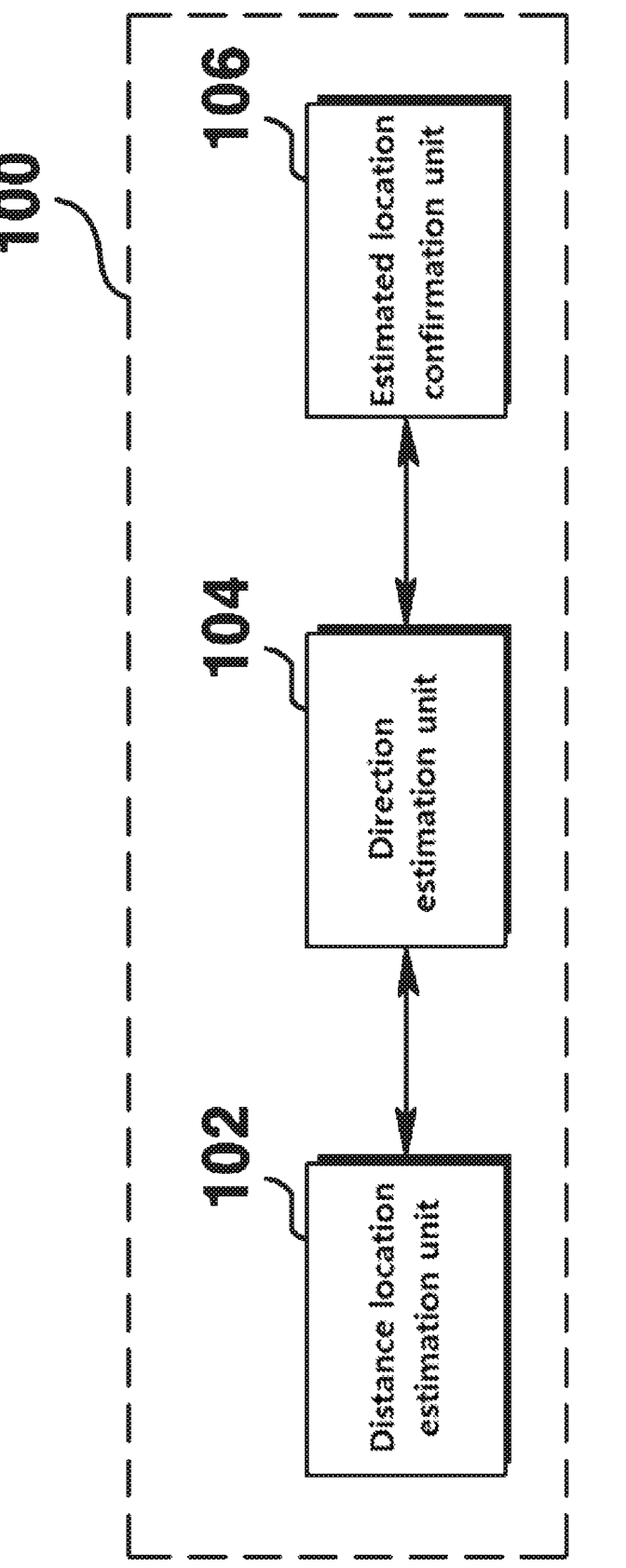
FIG. 1 is a diagram schematically illustrating the configuration of a transmitting device location estimation device that estimates the location of a transmitting device under water, according to an embodiment of the present invention.

Hereinafter, some embodiments of the present invention will be described through exemplary drawings. In describing the reference numerals to the components of each drawing, for the same components, even if they are displayed on different drawings, they are indicated with the same reference numerals as much as possible. In addition, in describing an embodiment of the present invention, if it is determined that a detailed description of a related known configuration or function hinders understanding of the embodiment of the present invention the detailed description will be omitted.

In addition, terms such as first, second, A, B, (a), and (b) may be used in describing components of an embodiment of the present invention. These terms are only used to distinguish the component from other components, and the nature, order, or sequence of the corresponding component is not limited by the term. When a component is described as being "connected", "coupled" or "interconnected" to another component, the component may be directly connected, coupled or interconnected to the other component, but it should be understood that another component may be "connected", "coupled" or "interconnected" between the component and the other component.

Figure 2:
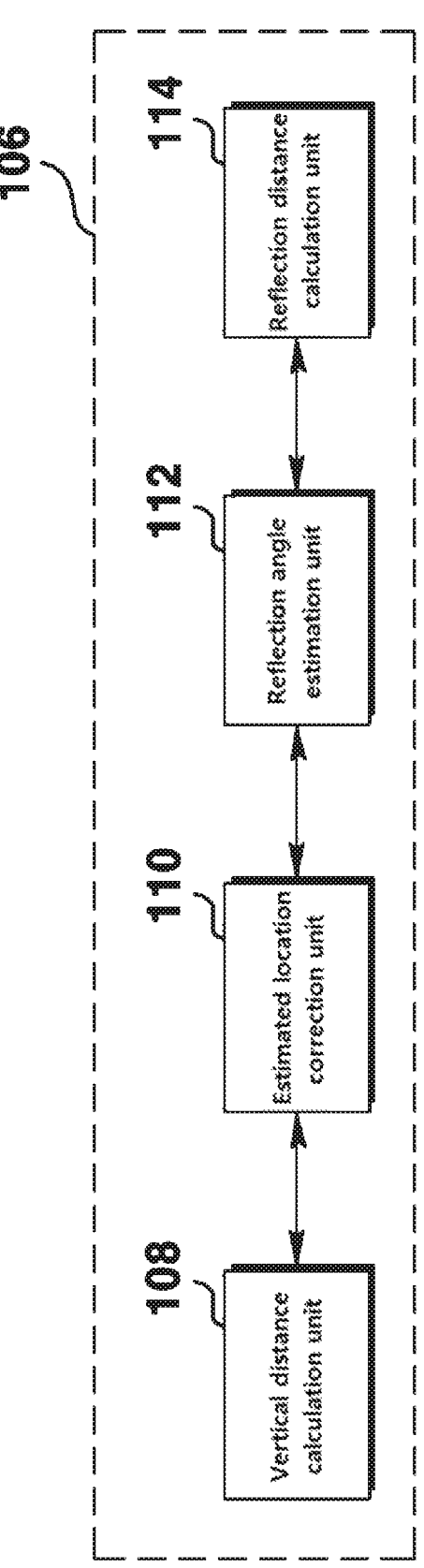
FIG. 2 is a diagram schematically illustrating the configuration of an estimated location confirmation unit shown in FIG. 1.

FIG. 1 is a diagram schematically illustrating the configuration of a transmitting device location estimation device that estimates the location of a transmitting device under water, according to an embodiment of the present invention; and FIG. 2 is a diagram schematically illustrating the configuration of an estimated location confirmation unit shown in FIG. 1. Here, a transmitting device location estimation device 100 is installed in a receiving device that receives the signal being transmitted by the transmitting device, and is therefore also called a reception device. It is installed in a receiving device that receives signals, and is therefore also called a receiving device.

Referring to FIGS. 1 and 2, the transmitting device location estimation device 100 includes a distance location estimation unit 102, a direction estimation unit 104, and an estimated location confirmation unit 106. In addition, the estimated location confirmation unit 106 may include a vertical distance calculation unit 108, an estimated location correction unit 110, a reflection angle estimation unit 112, and a reflection distance calculation unit 114.

The distance location estimation unit 102 estimates the distance and location of the transmitting device based on the time required to receive the transmitted signal transmitted by the transmitting device and the speed of the transmitted signal. Here, assuming that the speed of the transmitted signal of the transmitting device under water is c, and that the corresponding transmitted signal is received at time t after the transmitting device transmits the transmitted signal, the distance location estimation unit 102 can estimate the distance to the transmitting device as a value of cxt.

Figure 3:
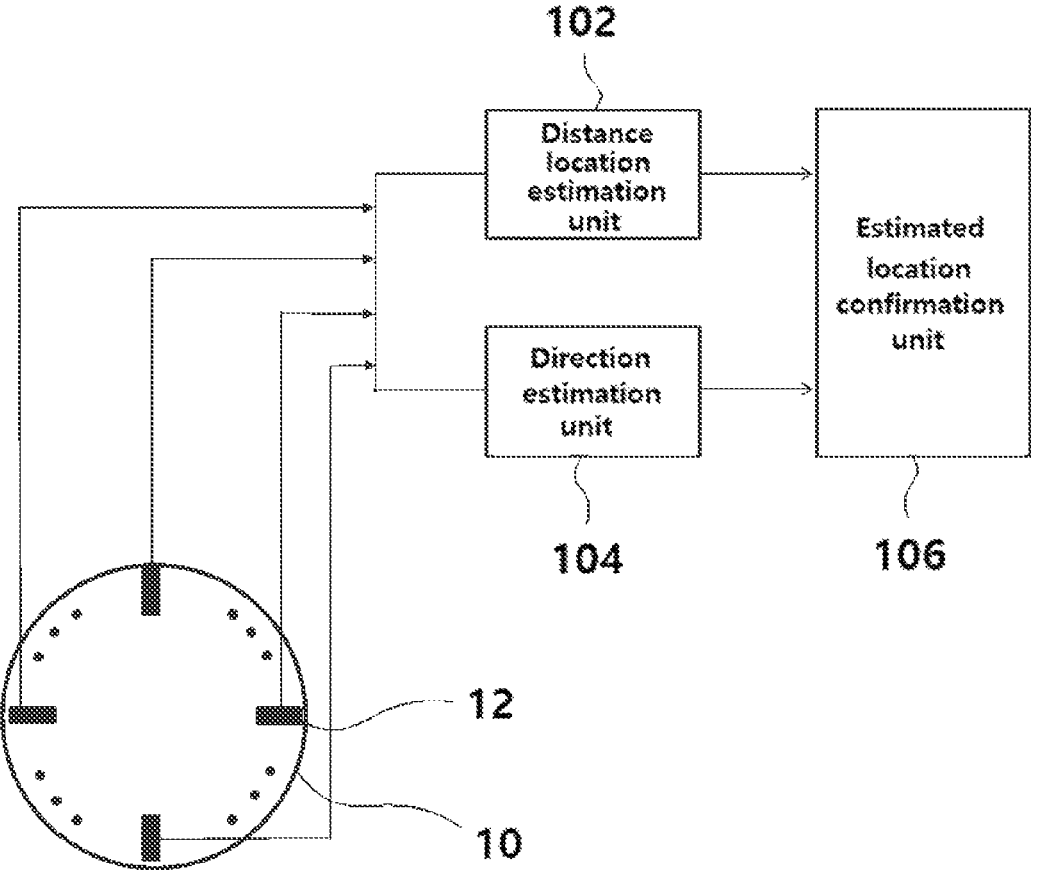
FIG. 3 is a diagram illustrating an example of estimating the distance and direction of a transmitting device by sharing pluralities of reception sensors.
Figure 4:
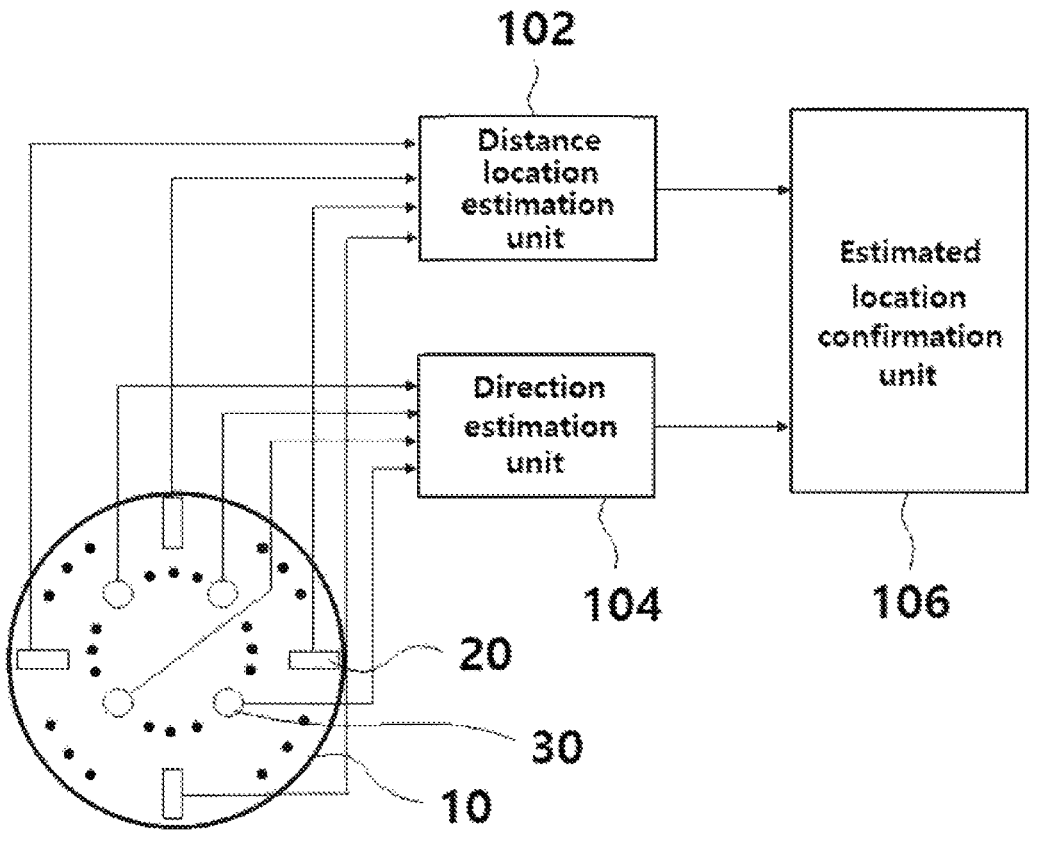
FIG. 4 is a diagram illustrating an example of estimating the distance and direction of a transmitting device using pluralities of different reception sensors.

Meanwhile, the transmitting device location estimation device 100, as illustrated in FIGS. 3 and 4, includes a signal reception module 10 equipped with pluralities of reception sensors 12, wherein a transmission signal transmitted by a transmitting device can be received through each of the reception sensors 12. In this case, the distance location estimation unit 102 can estimate the location of the transmitting device under water by using the estimated distance to the transmitting device and the time delay difference or phase of the signal being received by each of the reception sensors 12. Since the method for estimating the location of a transmitting device using such as the difference in time delay or phase of the signal is a known technique, detailed description thereof will be omitted here.

The direction estimation unit 104 estimates the direction of the transmitting device. At this time, the direction estimation unit 104 can estimate the direction of the transmitting device based on the difference in direction between the reference direction and the reception sensor 12, which has the largest strength of the received signal, among each of the reception sensors 12 provided in the signal reception module 10. In this case, the reference direction is a direction vertically downward from the current location of the transmitting device location estimation device 100, and the direction estimation unit 104 may estimate the direction of the transmitting device based on the difference between the direction in which the signal is received from the transmitting device and the reference direction.

Here, as illustrated in FIG. 3, the distance location estimation unit 102 and the direction estimation unit 104, as illustrated in FIG. 3, can estimate the distance, location, and direction of the transmitting device by sharing the pluralities of reception sensors 12 provided in the signal reception module 10.

In addition, the distance location estimation unit 102 and the direction estimation unit 104, as illustrated in FIG. 4, can also estimate the distance, location, and direction of the transmitting device by using different reception sensors 20 and 30 among the pluralities of reception sensors provided in the signal reception module 10.

The location estimated confirmation unit 106 confirms the estimated location of the transmitting device based on the distance and location of the transmitting device being estimated by distance location estimation unit 102 and the direction of the transmitting device being estimated by the direction estimation unit 104.

Figure 5:
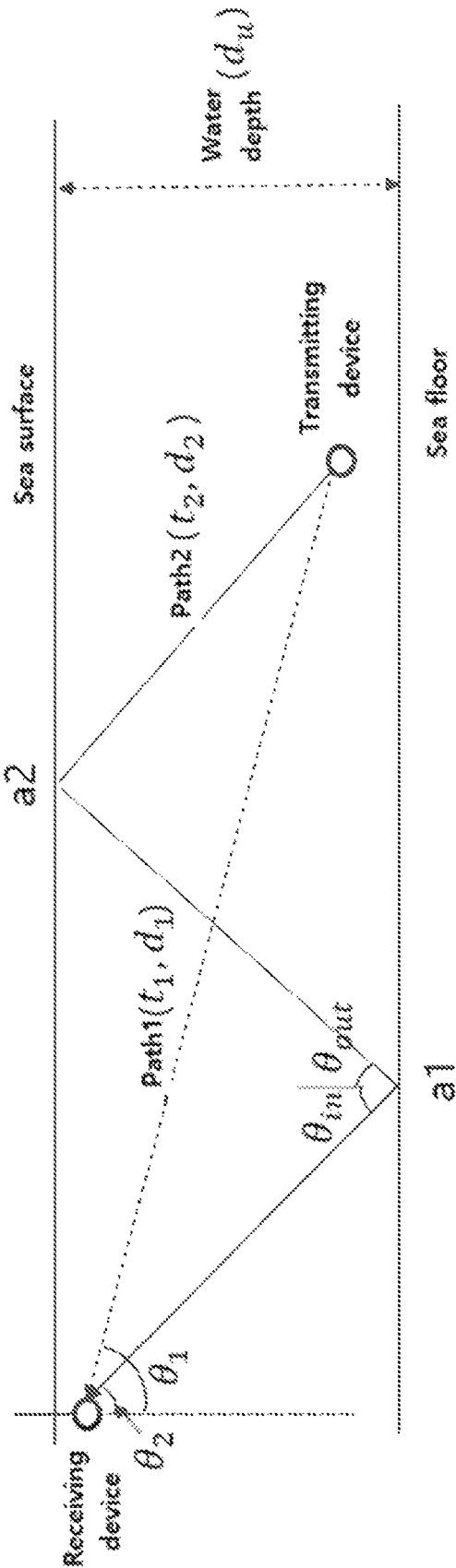
FIG. 5 is a diagram illustrating an example of estimating the location of a transmitting device.

Generally, in deep water environments, as shown in path 1 in FIG. 5, since the signal transmitted from the transmitting device is received directly, the location of the transmitting device can be estimated when the direction in which the transmitted signal is received and the distance to the transmitting device are known. In addition, the location of the transmitting device estimated in this way is within the error range of the location of the transmitting device in actual water.

However, in the case of a shallow water environment, the signal transmitted by the transmitting device, as shown in path 2 in FIG. 5, may be received by being reflected from the sea surface or the sea floor. In cases like this, although the actual distance to the transmitting device is $d_1$, since the receiving device does not know that the signal transmitted by the transmitting device is reflected and received from the sea surface or sea floor, the distance to the transmitting device may be estimated to be $t_2 \times c = d_2$ based on time $t_2$ corresponding to path 2. In addition, the receiving device may estimate that the transmitting device is located in the direction of the signal being reflected and received from the sea surface or sea floor, that is, the receiving direction $\theta_2$ of the reflected wave. In other words, in a shallow water environment, even though the actual transmitting device is located at a location that is a distance $d_1$ away in the direction of $\theta_1$, it may be estimated that the transmitting device is located at a location that is a distance $d_2$ away in the direction of $\theta_2$ based on the signal being reflected and received from the sea surface or sea floor, so there is a problem in that it may estimate a location that is significantly different from the actual location of the transmitting device under water.

To solve this problem, the estimated location confirmation unit 106 may confirm the estimated location of the transmitting device based on the distance and location of the transmitting device being estimated by the distance location estimation unit 102, and the direction of the transmitting device being estimated by the direction estimation unit 104. Hereinafter, the method how the location estimated confirmation unit 106 confirms the estimated location of the transmitting device will be described in detail.

The vertical distance calculation unit 108 calculates the vertical distance to the transmitting device based on the distance and location of the transmitting device being estimated by the distance location estimation unit 102, and the direction of the transmitting device being estimated by the direction estimation unit 104. At this time, the vertical distance calculation unit 106 can calculate the vertical distance to the transmitting device by taking the cosine in the direction of the transmitting device being estimated by the direction estimation unit 104 for the distance of the transmitting device being estimated by the distance location estimation unit 102.

For example, when a signal is received directly from a transmitting device as shown in path 1 of FIG. 5, the vertical distance calculation unit 108 may calculate $d_1 \cos \theta_1$, which is the cosine value of $\theta_1$ taken in the direction of the transmitting device being estimated by the direction estimation unit 104, as the vertical distance of the transmitting device for the distance $d_1$ of the transmitting device being estimated by the distance location estimation unit 102.

In addition, when receiving a reflected wave reflected on the sea surface or sea floor as shown in path 2 in FIG. 5, the vertical distance calculation unit 108 may calculate $d_2 \cos \theta_2$, which is the cosine value of $\theta_2$ taken in the direction of the transmitting device being estimated by the direction estimation unit 104, as the vertical distance of the transmitting device for the distance $d_2$ of the transmitting device being estimated by the distance location estimation unit 102.

Meanwhile, knowing the water depth of the relevant sea area, and assuming that the value is $d_u$, the value of the vertical distance $d_1 \cos \theta_1$ calculated by the vertical distance calculation unit 108 for the case when receiving a signal directly from a transmitting device becomes equal or less than the water depth $d_u$. In this case, the estimated location confirmation unit 106 can determine location of the transmitting device depending on the distance and location of the transmitting device being estimated by the distance location estimation unit 102, and the direction of the transmitting device being estimated by the direction estimation unit 104. In other words, When The cosine value of the angle taken in the direction being estimated by the direction estimation unit 104 is equal to or less than the water depth of the corresponding sea area, the estimated location confirmation unit 106 determines that the transmitting device is at the location of path 1 in FIG. 5 depending on the distance and location of the transmitting device being estimated by the distance location estimation unit 102, and the direction of the transmitting device being estimated by the direction estimation unit 104 for the distance estimated by the distance location estimation unit 102.

However, the vertical distance $d_2 \cos \theta_2$ calculated by the vertical distance calculation unit 108 when receiving a reflected wave reflected from the sea surface or the sea floor is greater than the water depth $d_u$. In this case, the estimated location confirmation unit 106 determines that the signal received from the transmitting device is a reflected wave reflected from the sea surface or the sea floor.

When the vertical distance being calculated by the vertical distance calculation unit 108 is greater than or equal to a preset distance, the estimated location correction unit 110 corrects the estimated location of the transmitting device. That is, when it is determined by the location estimated confirmation unit 106 that the signal being received from the transmitting device is a reflected wave reflected from the sea surface or sea floor, the estimated location correction unit 110 corrects the estimated location of the estimated transmitting device based on the distance of the transmitting device being estimated by the distance location estimation unit 102 and the direction of the transmitting device being estimated by the direction estimation unit 104. For example, as shown in path 2 in FIG. 5, when a transmission signal transmitted by a transmitting device is received through path 2, the distance $d_2$ of the transmitting device being estimated by the distance location estimation unit 102 and the location of the transmitting device and the direction being estimated by the direction of $\theta_2$ being estimated by the direction estimation unit 104, that is, the location separated away as much as $d_2$ in the direction of $\theta_2$ are corrected.

To this end, the reflection angle estimation unit 112 estimates the reflection angle of the transmitted signal from the seafloor or sea level when the vertical distance calculated by the vertical distance calculation unit 108 is greater than or equal to a preset distance. At this time, the reflection angle estimation unit 112 assumes that the reflection angle on the sea floor or sea surface is the same angle as the reception angle $\theta_2$ of the received reflected wave. In this case, the reflection angle estimation unit 112 assumes that the transmitted signal being transmitted by the transmitting device is incident ($\theta_{in}$) on the sea surface or sea floor at the same angle as the reception angle $\theta_2$ of the reflected wave and reflected ($\theta_{out}$) at the same angle.

The reflection distance calculation unit 114 calculates the reflection distance to the reflection point of the transmission signal transmitted by the transmitting device. At this time, when the transmission signal transmitted by the transmitting device is continuously reflected from the sea surface and the sea floor, the reflection distance calculation unit 114 can also calculate the reflection distance between each reflection points.

For example, as shown in path 2 in FIG. 5, when a signal being transmitted by the transmitting device is continuously reflected and received from the sea surface and the sea floor, The reflection distance calculation unit 114 may individually calculate a first reflection distance from the receiving device to the reflection point $a_1$, and a second reflection distance from reflection point $a_1$ to reflection point $a_2$.

At this time, since the water depth of the corresponding sea area and the depth of the receiving device (i.e., transmitting device location estimation device 100) are known, the reflection distance calculation unit 114 can calculate the first reflection distance to the reflection point $a_1$ by taking the secant ($\sec\theta_2 = 1/\cos\theta_2$) of the reception angle $\theta_2$ of the reflected wave for the distance from the receiving device to the sea floor.

In addition, the reflection distance calculation unit 114 may calculate the second reflection distance from reflection point $a_1$ to reflection point $a_2$ by taking the secant ($\sec\theta_2$) of the reception angle $\theta_2$ of the reflected wave at the water depth.

The estimated location correction unit 110 sums up each reflection distance being calculated by the reflection distance calculation unit 114, and corrects the estimated location of the transmitting device based on the summed value. At this time, the estimated location correction unit 110 sets a reflection path from the receiving device to the sea floor and sea surface based on the direction estimated by the direction estimation unit 104 and the water depth of the corresponding sea area, and may correct the location of the transmitting device as the point where the sum of the reflected distances becomes equal to the distance being estimated by the distance location estimation unit 102 among the set reflection paths.

For example, the estimated location correction unit 110 may set a reflection path such as path 2 in FIG. 5 based on the reception angle $\theta_2$ and water depth $d_u$ of the reflected wave. In addition, the estimated location correction unit 110 adds the first reflection distance to the reflection point $a_1$ and the second reflection distance from the reflection point $a_1$ to the reflection point $a_2$, may correct the location of the transmitting device as the point where the sum of all reflection distances becomes equal to the distance $d_2$ being estimated by the distance location estimation unit 102 among the reflection paths from reflection point $a_2$.

Through this, the transmitting device location estimation device according to an embodiment of the present invention can accurately estimates the location of the transmitting device even when the signal being transmitted by the transmitting device in a low-depth environment is received after being reflected from the sea surface or sea floor.

Figure 6:
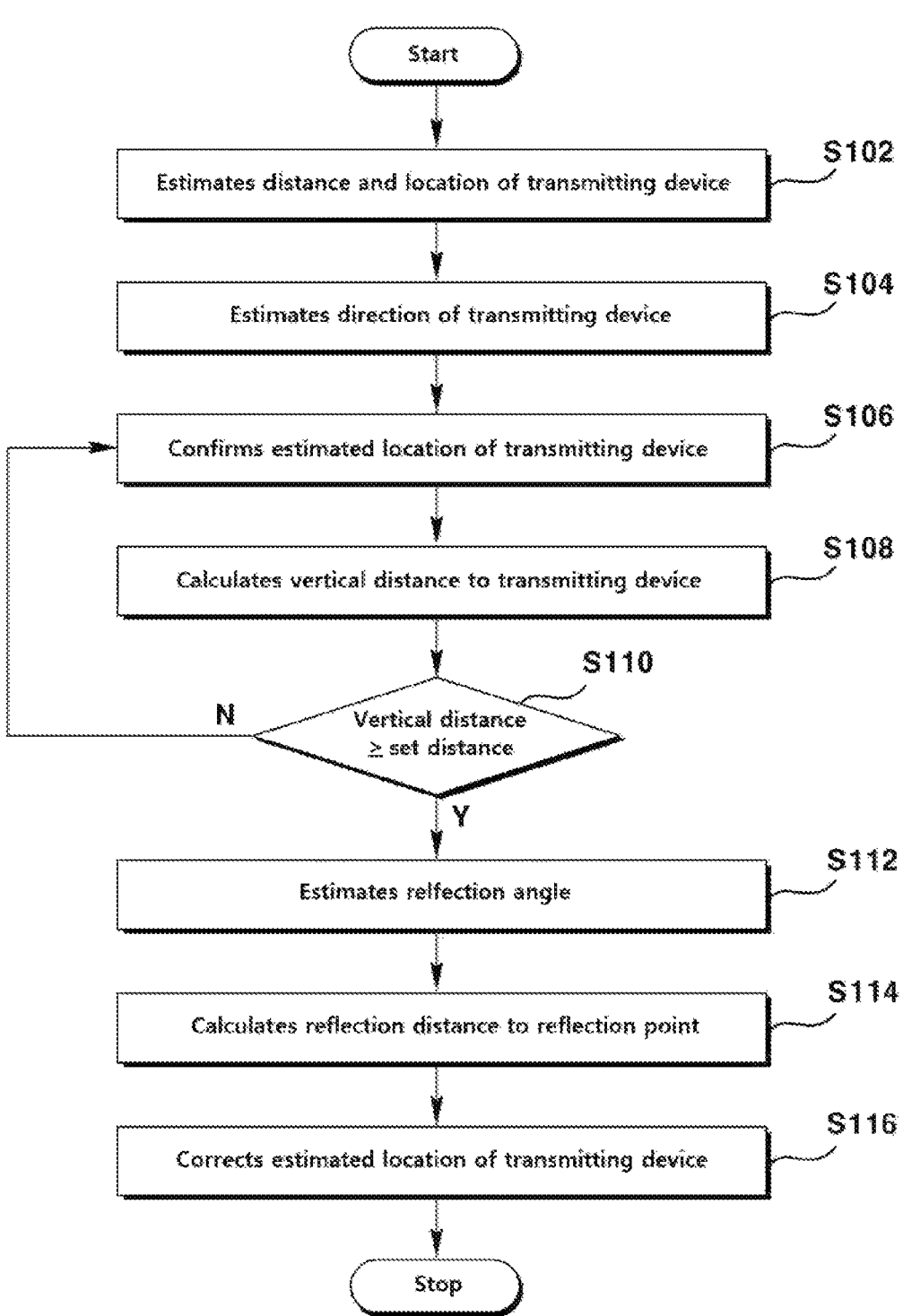
FIG. 6 is a flowchart illustrating a method for estimating the location of the transmitting device according to an embodiment of the present invention.

FIG. 6 is a flowchart illustrating a method for estimating the location of the transmitting device according to an embodiment of the present invention. A transmitting device location estimation method according to an embodiment of the present invention can be performed by the transmitting device location estimation device 100 shown in FIGS. 1 and 2.

Referring to FIGS. 1 to 6, a transmitting device location estimation device 100 estimates the distance and location of the transmitting device based on the time it takes to receive the signal transmitted by the transmitting device and the speed of the transmitted signal (S102). Here, assuming that the speed of the transmitted signal of the transmitting device under water is c, and that the transmitted signal is received at time t after the transmitting device transmits the transmitted signal, the distance location estimation unit 102 can estimate the distance to the transmitting device as c×t.

Meanwhile, the transmitting device location estimation device 100 includes a signal reception module 10 equipped with pluralities of reception sensors 12, wherein a transmission signal transmitted by a transmitting device can be received through each of the reception sensors 12. In this case, the distance location estimation unit 102 can estimate the location of the transmitting device under water by using the estimated distance to the transmitting device and the time delay difference or phase of the signal being received by each of the reception sensors 12. Since the method for estimating the location of a transmitting device using such as the difference in time delay or phase of the signal is a known technique, detailed description thereof will be omitted here.

The transmitting device location estimation device 100 estimates the direction of the transmitting device (S104). At this time, the transmitting device location estimation device 100 can estimate the direction of the transmitting device based on the reference direction and the difference in directions between the reception sensor 12, which has the highest intensity of the received signal, and the transmitting device among each of the reception sensors 12 provided in the signal reception module 10. In this case, the reference direction is a direction vertically downward from the current location of the transmitting device location estimation device 100, and the transmitting device location estimation device 100 may estimate the direction of the transmitting device based on the difference between the direction in which the signal is received from the transmitting device and the reference direction.

Here, the transmitting device location estimation device 100 can estimate the distance, location, and direction of the transmitting device by sharing pluralities of reception sensors 12 provided in the signal reception module 10.

In addition, the transmitting device location estimation device 100 can also estimate the distance, location, and direction of the transmitting device by using different reception sensors 20 and 30 among the pluralities of reception sensors provided in the signal reception module 10.

The transmitting device location estimation device 100 confirms the estimated location of the transmitting device based on the distance and location of the estimated transmitting device and direction of the estimated transmitting device (S106).

Generally, in deep water environments, as shown in path 1 in FIG. 5, since the signal transmitted from the transmitting device is received directly, the location of the transmitting device can be estimated when the direction in which the transmitted signal is received and the distance to the transmitting device are known. In addition, the location of the transmitting device estimated in this way is within the error range of the location of the transmitting device in actual water.

However, in the case of a shallow water environment, the signal transmitted by the transmitting device, as shown in path 2 in FIG. 5, may be received by being reflected from the sea surface or the sea floor. In cases like this, although the actual distance to the transmitting device is $d_1$, since the receiving device does not know that the signal transmitted by the transmitting device is reflected and received from the sea surface or sea floor, the distance to the transmitting device may be estimated to be $t_2 \times c = d_2$ based on time $t_2$ corresponding to path 2. In addition, the receiving device may estimate that the transmitting device is located in the direction of the signal being reflected and received from the sea surface or sea floor, that is, the receiving direction $\theta_2$ of the reflected wave. In other words, in a shallow water environment, even though the actual transmitting device is located at a location that is a distance $d_1$ away in the direction of $\theta_1$, it may be estimated that the transmitting device is located at a location that is a distance $d_2$ away in the direction of $\theta_2$ based on the signal being reflected and received from the sea surface or sea floor, so there is a problem in that it may estimate a location that is significantly different from the actual location of the transmitting device under water.

To solve this problem, the transmitting device location estimation device 100 may confirm the estimated location of the transmitting device based on the distance and location of the transmitting device being estimated. Hereinafter, the method how the transmitting device location estimation device 100 confirms the estimated location of the transmitting device will be described in detail.

The transmitting device location estimation device 100 calculates the vertical distance to the transmitting device based on the estimated distance and location of the transmitting device and the estimated direction of transmitting device (S108). At this time, the transmitting device location estimation device 100 can calculate the vertical distance to the transmitting device by taking cosine in the direction of the presumed transmitting device for the estimated distance of the transmitting device.

For example, when a signal is received directly from a transmitting device as shown in path 1 of FIG. 5, the transmitting device location estimation device 100 may calculate $d_1 \cos \theta_1$, which is the cosine value of $\theta_1$ taken in the direction of the transmitting device being estimated, as the vertical distance of the transmitting device for the distance $d_1$ of the transmitting device being estimated.

In addition, when receiving a reflected wave reflected on the sea surface or sea floor as shown in path 2 of FIG. 5, the transmitting device location estimation device 100 may calculate $d_2 \cos \theta_2$, which is the cosine value of $\theta_2$ taken in the direction of the transmitting device being estimated, as the vertical distance of the transmitting device for the distance $d_2$ of the transmitting device being estimated.

Meanwhile, knowing the water depth of the relevant sea area, and assuming that the value is $d_u$, the value of the vertical distance $d_1 \cos \theta_1$ calculated for the case when receiving a signal directly from a transmitting device becomes equal or less than the water depth $d_u$. In this case, the transmitting device location estimation device 100 can determine location of the transmitting device depending on the distance and location of the transmitting device being estimated, and the direction of the transmitting device being estimated. In other words, When the cosine value of the angle taken in the direction being estimated is equal to or less than the water depth of the corresponding sea area, the transmitting device location estimation device 100 determines that the transmitting device is at the location of path 1 in FIG. 5 depending on the distance and location of the transmitting device being estimated, and the direction of the transmitting device being estimated.

However, the calculated vertical distance $d_2 \cos \theta_2$ when receiving a reflected wave reflected from the sea surface or sea floor is greater than the water depth $d_u$. In this case, the transmitting device location estimation device 100 determines that the signal received from the transmitting device is a reflected wave reflected by the sea surface or the sea floor.

When the vertical distance being calculated is greater than or equal to a preset distance, the transmitting device location estimation device 100 corrects the estimated location of the transmitting device. That is, when it is determined that the signal being received from the transmitting device is a reflected wave reflected from the sea surface or sea floor, the transmitting device location estimation device 100 corrects the estimated location of the estimated transmitting device based on the distance of the transmitting device being estimated and the direction of the transmitting device being estimated. For example, as shown in path 2 in FIG. 5, when a transmission signal transmitted by a transmitting device is received through path 2, the distance $d_2$ of the transmitting device being estimated and the location of the transmitting device and the direction being estimated by the direction of $\theta_2$, that is, the location separated away as much as $d_2$ in the direction of $\theta_2$ are corrected.

To this end, the transmitting device location estimation device 100 estimates the reflection angle of the transmitted signal from the seafloor or sea level when the vertical distance being calculated is greater than or equal to a preset distance (S112). At this time, the transmitting device location estimation device 100 assumes that the reflection angle on the sea floor or sea surface is the same angle as the reception angle $\theta_2$ of the reflected wave being received. In this case, the transmitting device location estimation device 100 assumes that the transmitted signal being transmitted by the transmitting device is incident ($\theta_{in}$) on the sea surface or sea floor at the same angle as the reception angle $\theta_2$ of the reflected wave and reflected ($\theta_{out}$) at the same angle.

The transmitting device location estimation device 100 calculates the reflection distance to the reflection point of the transmission signal being transmitted by the transmitting device (S114). At this time, the transmitting device location estimation device 100 can calculate the reflection distance between each reflection point when the transmission signal being transmitted by the transmitting device is continuously reflected from the sea surface and the sea floor.

For example, as shown in path 2 in FIG. 5, when a signal being transmitted by the transmitting device is continuously reflected and received from the sea surface and the sea floor, The transmitting device location estimation device 100 may individually calculate a first reflection distance from the receiving device to the reflection point $a_1$, and a second reflection distance from reflection point $a_1$ to reflection point $a_2$.

At this time, since the water depth of the corresponding sea area and the depth of the receiving device (i.e., transmitting device location estimation device 100) are known, the transmitting device location estimation device 100 can calculate the first reflection distance to the reflection point $a_1$ by taking the secant ($\sec\theta_2=1/\cos\sin\theta_2$) of the reception angle $\theta_2$ of the reflected wave for the distance from the receiving device to the sea floor.

In addition, the transmitting device location estimation device 100 may calculate the second reflection distance from reflection point $a_1$ to reflection point $a_2$ by taking the secant ($\sec\theta_2$) of the reception angle $\theta_2$ of the reflected wave at the water depth.

The transmitting device location estimation device 100 sums up each reflection distance being calculated and corrects the estimated location of the transmitting device based on the summed value (S116). At this time, the transmitting device location estimation device 100 sets a reflection path from the receiving device to the sea floor and sea surface based on the direction being estimated and the water depth of the corresponding sea area, and may correct the location of the transmitting device as the point where the sum of the reflected distances becomes equal to the distance being estimated among the reflection paths being set.

For example, the transmitting device location estimation device 100 may set a reflection path such as path 2 in FIG. 5 based on the reception angle $\theta_2$ and water depth $d_u$ of the reflected wave. In addition, the transmitting device location estimation device 100 adds the first reflection distance to the reflection point $a_1$ and the second reflection distance from the reflection point $a_1$ to the reflection point $a_2$, may correct the location of the transmitting device as the point where the sum of all reflection distances becomes equal to the distance $d_2$ being estimated by the distance location estimation unit 102 among the reflection paths from reflection point $a_2$.

Through this, the transmitting device location estimation device according to an embodiment of the present invention can accurately estimates the location of the transmitting device even when the signal being transmitted by the transmitting device in a low-depth environment is received after being reflected from the sea surface or sea floor.

Although the embodiments according to the present invention have been described above, this is merely illustrative, and those skilled in the art will understand that various modifications and equivalent embodiments are possible therefrom. Therefore, the protection scope of the present invention should be defined by the following claims as well as equivalents thereto.

We claim:

1. In a transmitting device location estimation device for estimating the location of a transmitting device under water, the transmitting device location estimation device is characterized by comprising:

a distance location estimation unit that estimates the distance and location of the transmitting device based on the time taken to receive the transmission signal transmitted by the transmitting device and the speed of the transmission signal;

a direction estimation unit that estimates the direction of the transmitting device; and

12 an estimated location confirmation unit that confirms the estimated location of the transmitting device based on the estimated distance and location of the transmitting device and the estimated direction of the transmitting device;

wherein the estimated location confirmation unit includes:

a vertical distance calculation unit that calculates a vertical distance to the transmitting device based on the estimated distance and location of the transmitting device and the estimated direction of the transmitting device; and a distance location estimation unit that corrects the estimated location of the transmitting device when the calculated distance in the vertical direction is greater than or equal to a preset distance.

2. The transmitting device location estimation device according to claim 1, the estimated location confirmation unit further includes:

a reflection angle estimation unit that estimates a reflection angle of the transmission signal from the sea floor or sea water surface when the calculated distance in the vertical direction is greater than or equal to a preset distance; and a reflection distance calculation unit that calculates the reflection distance to a reflection point of the transmission signal, wherein the estimated location correction unit corrects the estimated location of the transmitting device based on the estimated distance of the transmitting device, the estimated reflection angle, and the calculated reflection distance to the reflection point.

3. The transmitting device location estimation device according to claim 1, characterized by further including:

a signal reception module for receiving the transmission signal using pluralities of reception sensors, wherein the distance location estimation unit and the direction estimation unit share at least one reception sensor among the pluralities of reception sensors, thereby estimating the distance and location and direction of the transmitting device.

4. The transmitting device location estimation device according to claim 1, characterized by further including:

a signal reception module that receives the transmitted signal using pluralities of reception sensors, wherein the distance location estimation unit and the direction estimation unit estimate the distance, location, and direction of the transmitting device by using different reception sensors among the pluralities of the reception sensors.

5. A method for estimating the location of a transmitting device, in a method for estimating the location of a transmitting device under water, characterized by comprising the steps of:

estimating the distance and location of the transmitting device based on the time it takes to receive a transmission signal transmitted by the transmitting device and the speed of the transmission signal;

estimating the direction of the transmitting device; and confirming the estimated location of the transmitting device based on the estimated distance and location of the transmitting device and the estimated direction of the transmitting device;

wherein the step of confirming the estimated location of the transmitting device includes the steps of:

calculating a vertical distance to the transmitting device based on the estimated distance and location of the transmitting device and the estimated direction of the transmitting device; and correcting the estimated location of the transmitting device when the calculated vertical distance is more than a preset distance, calculating a vertical distance to the transmitting device based on the estimated distance and location of the transmitting device and the estimated direction of the transmitting device; and correcting the estimated location of the transmitting device when the calculated vertical distance is more than a preset distance.

6. The method for estimating the location of a transmitting device according to claim 5, the step of conforming the estimated location of the transmitting device further includes the steps of:

estimating a reflection angle of the transmission signal on the sea floor or sea surface when the calculated vertical distance is greater than or equal to a preset distance; and calculating the reflection distance to the reflection point of the transmission signal, and wherein the step of correcting the estimated location corrects the estimated location of the transmitting device based on the estimated distance of the transmitting device, the estimated reflection angle, and the calculated reflection distance to the reflection point.

7. The method for estimating the location of a transmitting device according to claim 5, characterized by further including:

a step of receiving the transmitted signal using pluralities of reception sensors included in a signal reception module, wherein the step of estimating the distance and location of the transmitting device and the step of estimating the direction of the transmitting device share at least one reception sensor among the pluralities of reception sensors, thereby estimating the distance, location, and direction of the transmitting device.

8. The method for estimating the location of a transmitting device according to claim 5, characterized by further including:

a step of receiving the transmitted signal using pluralities of reception sensors included in a signal reception module, wherein the step of estimating the distance and location of the transmitting device and the step of estimating the direction of the transmitting device estimate the distance, location, and direction of the transmitting device by using different reception sensors among the pluralities of reception sensors.

\* \* \* \* \*